US012773864B2

(12) United States Patent
Chen et al.

(10) Patent No.: US 12,773,864 B2
(45) Date of Patent: Oct. 27, 2026

(54) CONTROL DEVICE, LOW-INK-AMOUNT DETECTION MECHANISM, INK CARTRIDGE AND LOW-INK-AMOUNT DETECTION METHOD THEREFOR

(71) Applicant: HANGZHOU CHIPJET TECHNOLOGY CO., LTD., Hangzhou (CN)

(72) Inventors: Weiwen Chen, Hangzhou (CN); Xijun Jiang, Hangzhou (CN); Heng Zhang, Hangzhou (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 163 days.

(21) Appl. No.: 18/841,408

(22) PCT Filed: Nov. 29, 2022

(86) PCT No.: PCT/CN2022/135180
§ 371 (c)(1),
(2) Date: Aug. 26, 2024

(87) PCT Pub. No.: WO2023/160080
PCT Pub. Date: Aug. 31, 2023

(65) Prior Publication Data

US 2025/0178367 A1 Jun. 5, 2025

(30) Foreign Application Priority Data

Feb. 25, 2022 (CN) ......................... 202210182991.4

(51) Int. Cl.
*B41J 29/387* (2006.01)
*B41J 2/175* (2006.01)
*B41J 29/393* (2006.01)

(52) U.S. Cl.
CPC ......... *B41J 29/387* (2013.01); *B41J 2/17513* (2013.01); *B41J 2/1753* (2013.01);
(Continued)

(58) Field of Classification Search
CPC .... B41J 29/387; B41J 2/17513; B41J 2/1753; B41J 2/17566; B41J 29/393; B41J 2002/17576; B41J 2002/17589
(Continued)

(56) References Cited

U.S. PATENT DOCUMENTS 6,106,087 A 8/2000 Kishi
6,155,664 A * 12/2000 Cook ....................... B41J 2/195 347/7

(Continued)

FOREIGN PATENT DOCUMENTS

CN 103342052 A 10/2013
CN 203472285 U * 3/2014

(Continued)

OTHER PUBLICATIONS

European Search Report of European Patent Application No. 22928340.3 issued on Dec. 17, 2025.

(Continued)

*Primary Examiner* — Mark Edwards

(57) ABSTRACT

Disclosed in the present application are a control device, a low-ink-amount detection mechanism, an ink cartridge and a low-ink-amount detection method therefor. The control device is used for controlling a printer, and comprises a chip and a control unit, the control unit is in electrical connection and/or in communication connection with the chip. The control unit can control a working state of the chip, so as to control the electrical connection and/or communication connection between the chip and the printer. The low-ink-amount detection mechanism comprises a trigger element
(Continued)

and a control device. When ink in an ink cartridge is less or used up, the trigger element can get close to or abut against the control unit and can control a working state of the control unit, and then controls the electrical connection and/or the communication connection between the chip and the printer, so that the printer stops printing.

26 Claims, 9 Drawing Sheets

(52) U.S. Cl.
CPC ......... *B41J 2/17566* (2013.01); *B41J 29/393* (2013.01); *B41J 2002/17576* (2013.01); *B41J 2002/17589* (2013.01)

(58) Field of Classification Search
USPC ............................................................ 347/14
See application file for complete search history.

(56) References Cited

U.S. PATENT DOCUMENTS 6,234,597 B1 5/2001 Suzuki et al.
2002/0085050 A1 7/2002 Aruga et al.
2004/0155913 A1 8/2004 Kosugi et al.
2011/0249064 A1 * 10/2011 Wang ..................... B41J 2/1752 347/86
2014/0204138 A1 7/2014 Wang

FOREIGN PATENT DOCUMENTS

CN 206426659 U * 8/2017
CN 107757133 A 3/2018
CN 110228295 A 9/2019
CN 111196089 A 5/2020
CN 211441595 U 9/2020
DE 202021105785 U1 * 11/2021 .......... B41J 2/17566
JP H11138843 A 5/1999
JP 2016179633 A 10/2016
JP 2018099893 A 6/2018
WO 2016150399 A1 9/2016

OTHER PUBLICATIONS

International Search Report of PCT Patent Application No. PCT/CN2022/135180 issued on Feb. 27, 2023.

* cited by examiner

CONTROL DEVICE, LOW-INK-AMOUNT DETECTION MECHANISM, INK CARTRIDGE AND LOW-INK-AMOUNT DETECTION METHOD THEREFOR

CROSS REFERENCE TO RELATED APPLICATION

The present application is proposed based on International Application No. PCT/CN2022/135180, filed on Nov. 29, 2022, which claims priority to Chinese patent application No. 202210182991.4, filed on Feb. 25, 2022. The disclosures of the aforementioned applications are hereby incorporated by reference in their entireties.

TECHNICAL FIELD

The present application relates to the technical field of printing equipment, and in particular to a control device, a low-ink-amount detection mechanism, an ink cartridge and a low-ink-amount detection method therefor.

BACKGROUND

An ink cartridge is used to hold ink and can be installed on a printer to provide ink therefor, as the printer operates, the ink in the ink cartridge is gradually consumed, that is, an ink amount gradually decreases, when ink in the ink cartridge is less or used up, the printer cannot print normally and the printed documents may not be usable, which results in paper waste, moreover, if the printer cannot print normally but keeps operating, it will further cause waste of resources in the printer.

SUMMARY

The present application relates to a control device, a low-ink-amount detection mechanism, an ink cartridge and a low-ink-amount detection method therefor, so as to solve the problem of paper waste and waste of resources in the printer when ink in the ink cartridge is less or used up.

In order to solve the above-mentioned problem, the present application adopts the following technical solutions.

A control device for controlling a printer, wherein the control device comprises a chip and a control unit, the control unit is in electrical connection and/or in communication connection with the chip; the control unit can control a working state of the chip, so as to control the electrical connection and/or communication connection between the chip and the printer.

Optionally, the control unit is a sensing element which is in electrical connection and/or in communication connection with the chip, the sensing element can vary a voltage/current signal according to external conditions and transmit the voltage/current signal to the chip, when the voltage/current signal is determined to reach a preset condition by the chip, the chip enters a low-ink-amount working mode, so that the chip disables its electrical connection and/or normal communication connection with the printer, the printer stops printing.

Optionally, the control unit is a switch element;

- the closing of the switch element can disable the electrical connection and/or normal communication connection between the chip and the printer, the printer stops printing;
- alternatively, the opening of the switch element can disable the electrical connection and/or normal communication connection between the chip and the printer, the printer stops printing;
- alternatively, the closing or opening of the switch element can control the chip to enter a low-ink-amount working mode, so that the chip disables its electrical connection and/or normal communication connection with the printer, the printer stops printing.

Optionally, the chip comprises at least two connection terminals, the switch element is disposed between two of the connection terminals, and the switch element can enable or disable the electrical connection between the two connection terminals, where the two connection terminals are disconnected, the chip can establish an electrical connection and/or a normal communication connection with the printer; where the two connecting terminals are connected, the chip is short-circuited, and its electrical connection and/or the normal communication connection with the printer can be disabled.

Optionally, the switch element, the chip and the printer are connected in series, and the switch element is disposed between the chip and the printer, where the switch element is closed, the chip can establish an electrical connection and/or a normal communication connection with the printer; where the switch element is open, the chip is open-circuited, and its electrical connection and/or normal communication connection with the printer can be disabled.

Optionally, the chip comprises a determination module, a signal-transmission terminal and a signal-reception terminal, the sensing element can vary a voltage/current signal of the signal-transmission terminal and the signal-reception terminal according to external conditions, when the voltage/current signal is determined to reach a preset condition by the determination module, the chip enters a low-ink-amount working mode, and the chip disables its electrical connection and/or normal communication connection with the printer.

Optionally, the chip comprises a determination module, a signal-transmission terminal and a signal-reception terminal, the switch element can enable or disable the electrical connection between the signal-transmission terminal and the signal-reception terminal, where the electrical connection between the signal-transmission terminal and the signal-reception terminal is enabled or disabled by the switch element, the chip is determined to enter a low-ink-amount working mode by the determination module, the chip disables its electrical connection and/or normal communication connection with the printer.

Optionally, the chip entering a low-ink-amount working mode, and the chip disabling its electrical connection and/or normal communication connection with the printer comprises at least one of that:

- any two connection terminals of the chip are controlled to be short-circuited, so that the chip disables its electrical connection and/or normal communication connection with the printer;
- the chip is controlled to disable the electrical connection between any of its connection terminals and the printer, so that the chip disables its electrical connection and/or normal communication connection with the printer;
- the chip is controlled to transmit low-ink-amount data to the printer, so that the printer disables its electrical connection and/or normal communication connection with the chip after receiving the low-ink-amount data transmitted by the chip;
- the chip is controlled to transmit incorrect ink cartridge information/data to the printer, so that the printer reports an error, and then disables its electrical connection and/or normal communication connection with the printer.

A low-ink-amount detection mechanism, comprising a trigger element and the above-mentioned control device, wherein the trigger element can move along with the change of an ink amount, when the ink amount decreases to a first preset value, the trigger element can get close to or abut against the control unit and can control a working state of the control unit.

Optionally, the control unit is a sensing element, the trigger element can get close to the sensing element, such that a voltage/current signal of the sensing element varies and the voltage/current signal is transmitted to the chip, when the voltage/current signal is determined to reach a preset condition by the chip, the chip enters a low-ink-amount working mode, so that the chip disables its electrical connection and/or normal communication connection with the printer, the printer stops printing.

Optionally, the control unit is a switch element, when the ink amount decreases to a first preset value, the trigger element can abut against the switch element so as to trigger the closing or opening of the switch element.

Optionally, the switch element comprises a switch contact and a conductive part, the trigger element is a floating part, when the ink amount decreases to a first preset value, the floating part can crimp the conductive part to the switch contact so as to trigger the closing of the switch element.

Optionally, the switch element comprises a switch contact and a conductive part, the trigger element comprises a floating part and a connection part, the floating part can move along with the change of an ink amount, the floating part can abut against or be connected to the connection part and drives the connection part to move, when the ink amount decreases to a first preset value, the connection part can disconnect the conductive part from the switch contact so as to trigger the opening of the switch element.

Optionally, the switch element comprises a first contact and a second contact, and the trigger element is a conductive floating part, when the ink amount decreases to a first preset value, the conductive floating part can connect the first contact and the second contact so as to trigger the closing of the switch element.

Optionally, the switch element comprises a first contact, a second contact and a conductive part, the trigger element is a floating part, the floating part can move along with the change of an ink amount, the floating part can abut against or be connected to the conductive part and drives the conductive part to move, when the ink amount decreases to a first preset value, the conductive part can connect or disconnect the first contact and the second contact so as to trigger the closing or opening of the switch element.

Optionally, the control unit is a switch element, and the switch element is a sensing switch element, when the ink amount decreases to a first preset value, the trigger element can move into a sensing range of the switch element so as to trigger the closing or opening of the switch element.

Optionally, the switch element further comprises a signal-reception unit and a controller, the signal-reception unit is used to receive a signal from the trigger element, and the controller is used to control the closing or opening of the switch element according to the signal from the trigger element.

Optionally, the switch element is a Hall sensor switch element, a pressure sensor switch element or a position sensor switch element.

An ink cartridge, comprising a housing and the above-mentioned low-ink-amount detection mechanism, wherein the housing is provided with a chamber for holding ink, the trigger element is disposed in the chamber, and the chip is disposed on the housing.

Optionally, a limiting member is disposed in the housing, when the ink amount is greater than a second preset value, the limiting member can limit the movement of the trigger element, and the second preset value is greater than the first preset value.

Optionally, the trigger element being disposed in the chamber comprises at least one of that:

a mounting plate is disposed in the housing, the mounting plate is provided with a guide hole, the trigger element is a columnar trigger element, the trigger element extends into the guide hole, and the trigger element can be in slip-fit with the guide hole;

a guide groove is disposed in the housing, the trigger element is a block-shaped or spherical trigger element, the trigger element is disposed in the guide groove, and the trigger element can be in slip-fit with an inner wall of the guide groove;

a guide column is disposed in the housing, the trigger element is a sheet-like trigger element, the trigger element is provided with a mounting hole, and the mounting hole can be in slip-fit with the guide column;

a pivot shaft is disposed in the housing, the trigger element is a rod-shaped trigger element, the trigger element is provided with a hinge portion, and the hinge portion can be in running-fit with the pivot shaft.

A low-ink-amount detection method for an ink cartridge, wherein the ink cartridge is the above-mentioned ink cartridge, and the control unit is a sensing element;

the trigger element moves along with the change of an ink amount;

when the ink amount decreases to a first preset value, the trigger element triggers a voltage/current signal of the sensing element to vary, and the voltage/current signal is transmitted to the chip, when the voltage/current signal is determined to reach a preset condition by the chip, the chip enters a low-ink-amount working mode, so that the chip disables its electrical connection and/or normal communication connection with the printer, the printer stops printing.

A low-ink-amount detection method for an ink cartridge, wherein the ink cartridge is the above-mentioned ink cartridge, and the control unit is a switch element;

the trigger element moves along with the change of an ink amount;

when the ink amount decreases to a first preset value, the trigger element triggers the opening or closing of the switch element, the switch element controls a working state of the chip, so as to disable the electrical connection and/or normal communication connection between the chip and the printer, the printer stops printing.

Optionally, the switch element controlling a working state of the chip, so as to disable the electrical connection and/or normal communication connection between the chip and the printer comprises that:

the switch element is closed and two connection terminals of the chip are connected, such that the chip is in a short-circuit state, so as to disable the electrical connection and/or normal communication connection between the chip and the printer; alternatively, the switch element is open, such that the chip is in an open-circuit state, so as to disable the electrical connection and/or normal communication connection between the chip and the printer; alternatively, the chip enters a low-ink working mode, so as to disable the electrical connection and/or normal communication connection between the chip and the printer.

Optionally, the chip entering a low-ink-amount working mode, so as to disable the electrical connection and/or normal communication connection between the chip and the printer comprises at least one of that:

any two connection terminals of the chip are controlled to be short-circuited, so that the chip disables its electrical connection and/or normal communication connection with the printer;

the chip is controlled to disable the electrical connection between any of its connection terminals and the printer, so that the chip disables its electrical connection and/or normal communication connection with the printer;

the chip is controlled to transmit low-ink-amount data to the printer, so that the printer disables its electrical connection and/or normal communication connection with the chip after receiving the low-ink-amount data transmitted by the chip;

the chip is controlled to transmit incorrect ink cartridge information/data to the printer, so that the printer reports an error, and then the chip disables its electrical connection and/or normal communication connection with the printer.

The technical solutions adopted in the present application can achieve the following beneficial effects:

by means of the control device, the low-ink-amount detection mechanism, the ink cartridge and the low-ink-amount detection method therefor of the present application, the control device, which comprises a chip and a control unit, is used to control a printer, the control unit can control a working state of the chip, so as to control the electrical connection and/or communication connection between the chip and the printer; the low-ink-amount detection mechanism comprises a trigger element and the above-mentioned control device, the trigger element can move along with the change of an ink amount, when the ink amount decreases to a first preset value, the trigger element can get close to or abut against the control unit and can control a working state of the control unit, so as to disable the electrical connection and/or normal communication connection between the chip and the printer. As a result, when ink in an ink cartridge is sufficient, the printer can print normally; when ink in an ink cartridge is less or used up, the electrical connection and/or normal communication connection between the chip and the printer is disabled, so that the printer stops printing. Therefore, when ink in an ink cartridge is less or used up, paper waste and waste of resources in the printer caused by incapability of normal printing or continuous operation of the printer can be avoided.

BRIEF DESCRIPTION OF DRAWINGS

The drawings illustrated here are used to provide further understanding of the present application and constitute a part of thereof, the illustrative embodiments of the present application and their description are used to explain the present application without constituting an improper limitation on the present application. In the drawings.

LIST OF REFERENCE SIGNS

100—control device, 110—chip, 111—signal-transmission terminal, 112—signal-reception terminal, 113—connection terminal, 114—determination module, 120—switch element, 121—switch contact, 122—conductive part, 123—first contact, 124—second contact, 130—sensing element,

210—floating part, 220—connection part, 240—magnetic part,

500—printer,

600—housing, 610—mounting plate, 620—guide groove, 630—guide column, 640—pivot shaft, 650—chamber, 660—limiting member.

DETAILED DESCRIPTION

In order to make the purpose, technical solutions and advantages of the present application clearer, the technical solutions of the present application will be described explicitly and thoroughly below with reference to specific embodiments of the present application and corresponding drawings. Obviously, the embodiments described herein are merely a part of the embodiments of the present application rather than all of them. All other embodiments obtained by a person skilled in the art without creative work based on embodiments in the present application fall within the scope of the present application.

The technical solutions disclosed in various embodiments of the present application will be described in detail below with reference to the accompanying drawings.

The present application provides a control device 100, a low-ink-amount detection mechanism, an ink cartridge and a low-ink-amount detection method therefor. The control device 100, the low-ink-amount detection mechanism, the ink cartridge and the low-ink-amount detection method therefor are described in detail below with reference to FIG. 1 to FIG. 16.

An embodiment of the present application provides a control device 100 which is used to control a printer 500, and the printer 500 can be controlled to print normally or to stop printing by the control device 100. The control device 100 comprises a chip 110 and a control unit, and the chip 110 is in connection with the control unit, for example, the control unit can be in electrical connection and/or in communication connection with the chip 110. The control unit can control a working state of the chip 110 in order to control the electrical connection and/or communication connection between the chip 110 and the printer 500, so as to control the printer 500 to print normally or to stop printing.

Figure 1:
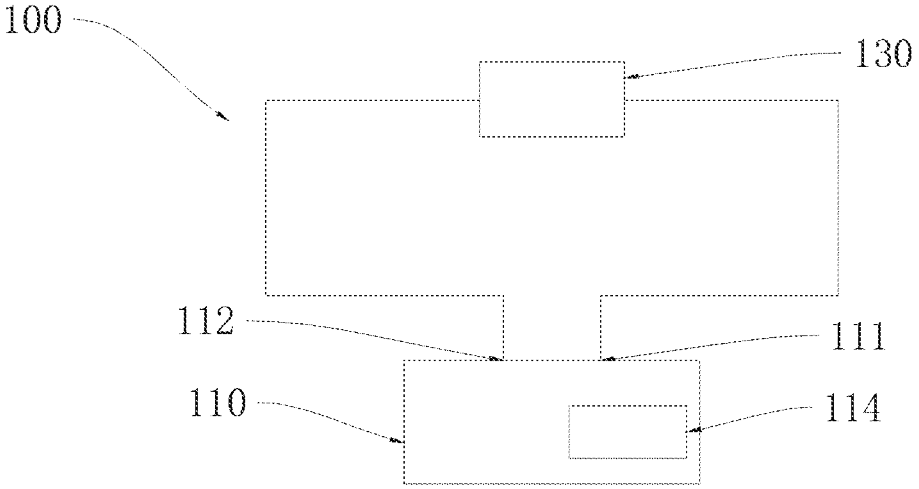
FIG. 1 is a schematic view of a control device in an embodiment of the present application.

As shown in FIG. 1, the control unit can be a sensing element 130 which is in electrical connection and/or in communication connection with the chip 110, the sensing element 130 can vary a voltage/current signal according to external conditions and transmit the voltage/current signal to the chip 110. When the voltage/current signal is determined to reach a preset condition by the chip 110, the electrical connection and/or normal communication connection between the chip 110 and the printer 500 can be disabled, the printer 500 stops printing. The sensing element 130 can be an element that controls a voltage/current signal to vary continuously, such as a pressure sensor, a slide rheostat, etc. Embodiments of the present application do not limit the type of the sensing element 130.

In addition, it should be noted that, "a voltage/current signal reaches a preset condition" in the present application can mean that either a voltage/current value reaches a threshold, or the variation of a voltage/current value reaches a threshold. The "threshold" here refers to a voltage/current value that is preset based on the usage environment of the chip 110. For example, the chip 110 is disposed on a consumable ink cartridge which comprises a sensing element 130, as ink in the consumable ink cartridge is consumed, the sensing element 130 can vary a voltage/current signal and transmit the voltage/current signal to the chip 110, the voltage/current value that is transmitted to the chip 110 by the sensing element 130 when ink in the consumable ink cartridge is consumed to a certain critical condition is set as a "threshold" of the chip by the chip, the critical condition can be the depletion of ink in the consumable ink cartridge or imperfect printing, or any other condition that prevents normal printing. Here, by varying a voltage/current signal between the sensing element 130 and the chip 110, the sensing element 130 can control a working state of the chip 110. In the present application, the sensing element 130 controlling a working state of the chip 110 is specifically as follows: the sensing element 130 controls the chip 110 to enter a low-ink-amount working mode.

The chip 110 comprises a determination module 114, a signal-transmission terminal 111 and a signal-reception terminal 112. The sensing element 130 can vary a voltage/current signal between the signal-transmission terminal 111 and the signal-reception terminal 112 according to external conditions. Specifically, when an ink amount is greater than a first preset value, the voltage/current signal controlled by the sensing element 130 is higher than a threshold of the chip 110, as ink is consumed, the ink amount gradually decreases, and the voltage/current signal controlled by the sensing element 130 continuously decreases; when the ink amount decreases to the first preset value and the voltage/current signal controlled by the sensing element 130 is determined to be less than/lower than the threshold of the chip 110 by the determination module 114, the chip 110 enters a low-ink-amount working mode, and the chip 110 disables its electrical connection and/or normal communication connection with the printer 500. In addition, the arrows and waveforms shown in FIG. 1 indicate that the signal-transmission terminal 111 transmits a high-level signal or a low-level signal.

Alternatively, the chip 110 comprises a determination module 114, a signal-transmission terminal 111 and a signal-reception terminal 112. The sensing element 130 can vary a voltage/current signal between the signal-transmission terminal 111 and the signal-reception terminal 112 according to external conditions. Specifically, when an ink amount is greater than a first preset value, the voltage/current signal controlled by the sensing element 130 is lower than a threshold of the chip 110, as ink is consumed, the ink amount gradually decreases, and the voltage/current signal controlled by the sensing element 130 gradually increases; when the ink amount decreases to the first preset value and the voltage/current signal controlled by the sensing element 130 is determined to be greater than/higher than the threshold of the chip 110 by the determination module 114, the chip 110 enters a low-ink-amount working mode, and the chip 110 disables its electrical connection and/or normal communication connection with the printer 500.

The first preset value herein can be zero, that is, when an ink amount is greater than zero, the printer 500 prints normally, and when the ink amount is zero, the printer 500 stops printing. The first preset value can also be a value that is slightly greater than zero, which means that there is no need to wait until the ink is used up before the printer 500 is controlled to stop printing, the printer 500 can be controlled to stop when there is less ink. The first preset value can also be other values that are set as needed.

The chip 110 enters a low-ink-amount working mode, and the chip 110 disables its electrical connection and/or normal communication connection with the printer 500, which can be the case that any two connection terminals of the chip 110 are controlled to be short-circuited, so that the chip 110 disables its electrical connection and/or normal communication connection with the printer 500.

Alternatively, the chip 110 enters a low-ink-amount working mode, and the chip 110 disables its electrical connection and/or normal communication connection with the printer 500, which can also be the case that the chip 110 is controlled to disables the electrical connection between any of its connection terminals 113 and the printer 500, so that the chip 110 disables its electrical connection and/or normal communication connection with the printer 500;

- alternatively, the chip 110 enters a low-ink-amount working mode, and the chip 110 disables its electrical connection and/or normal communication connection with the printer 500, which can also be the case that the chip 110 is controlled to transmit low-ink-amount data to the printer 500, so that the printer 500 disables its electrical connection and/or communication connection with the chip 110 after receiving the low-ink-amount data transmitted by the chip 110;
- alternatively, the chip 110 enters a low-ink-amount working mode, and the chip 110 disables its electrical connection and/or normal communication connection with the printer 500, which can also be the case that the chip 110 is controlled to transmit incorrect ink cartridge information/data to the printer 500, so that the printer 500 reports an error, and then the chip 110 disables its electrical connection and/or communication connection with the printer 500.

Further, the above-mentioned ways in which the chip 110 enters a low-ink-amount working mode, and the chip 110 disables its electrical connection and/or normal communication connection with the printer 500, can be selected according to the structure of an ink cartridge, and can also be used in combination of two or more ways.

By means of the control device 100 of embodiments of the present application, which control device 100 is used to control a printer 500, the control device 100 comprises a chip 110 and a control unit, the control unit is in electrical connection and/or in communication connection with the chip 110; the control unit can control a working state of the chip 110, in order to control the electrical connection and/or communication connection between the chip 110 and the printer 500, so as to control the printer 500 to print normally or to stop printing. As a result, when ink in an ink cartridge is sufficient, the printer 500 is controlled to print normally by the control device 100; when ink in an ink cartridge is less or used up, the printer 500 is controlled to stop printing by the control device 100. Therefore, when ink in an ink cartridge is less or used up, paper waste and waste of resources in the printer 500 caused by incapability of normal printing or continuous operation of the printer 500 can be avoided.

In an embodiment of the present application, a normal communication connection refers to correct data interaction between the printer 500 and the chip 110 when the printer 500 is in a normal-printing state, that is, if there is a normal communication connection between the chip 110 and the printer 500, correct data interaction can be performed between the printer 500 and the chip 110, and the printer 500 can print normally.

In other embodiments, referring to FIG. 2 to FIG. 5, the control unit can be a switch element 120 which is an element that enables signal on/off, the type of the switch element 120 is not limited in embodiments of the present application. The switch element 120 has two states: closing and opening, and the closing or opening of the switch element 120 can control a working state of the chip 110, in order to control the electrical connection and/or communication connection between the chip 110 and the printer 500, so as to control the printer 500 to print normally or to stop printing.

Here, the closing or opening of the switch element 120 can control a working state of the chip 110, which can be the case that the switch element 120 can either directly control a short-circuit state or an open-circuit state of the chip 110, or the switch element 120 can control the chip 110, for example, the chip 110 comprises a determination module 114, and the chip 110 is controlled to be short-circuited or open-circuited, or to enter a low-ink-amount working mode by the determination module 114 thereof.

In one implementation of an embodiment of the present application, the closing of the switch element 120 can disable the electrical connection and/or normal communication connection between the chip 110 and the printer 500. For example, referring to FIG. 2, the closing of the switch element 120 can enable the chip 110 to be short-circuited, so as to disable the electrical connection and/or normal communication connection between the chip 110 and the printer 500.

Alternatively, the opening of the switch element 120 can disable the electrical connection and/or normal communication connection between the chip 110 and the printer 500. For example, referring to FIG. 3, the opening of the switch element 120 can enable the chip 110 to be open-circuited, so as to disable the electrical connection and/or normal communication connection between the chip 110 and the printer 500.

Figure 4:
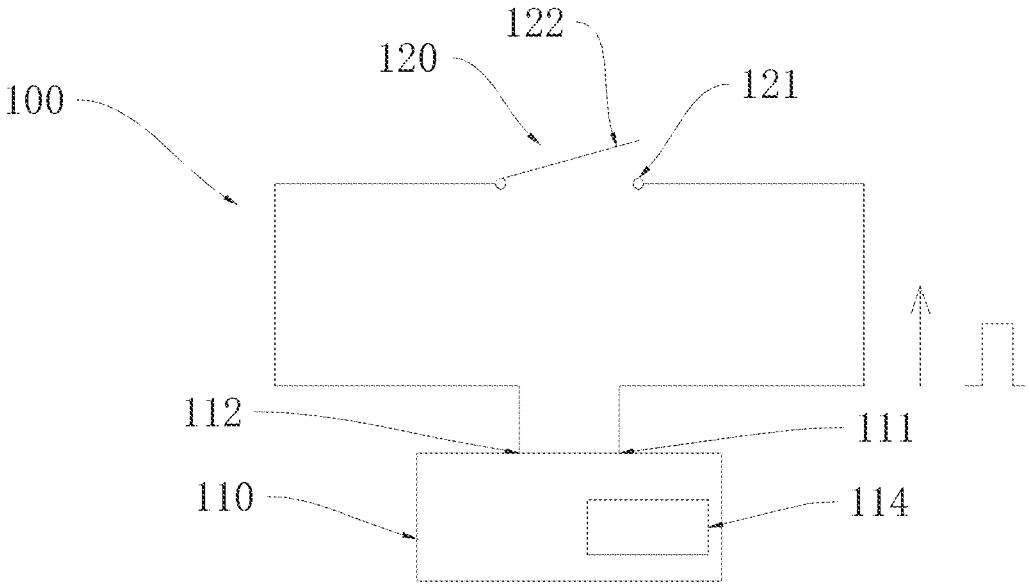
FIG. 4 is a schematic view of a control device in another embodiment of the present application.
Figure 5:
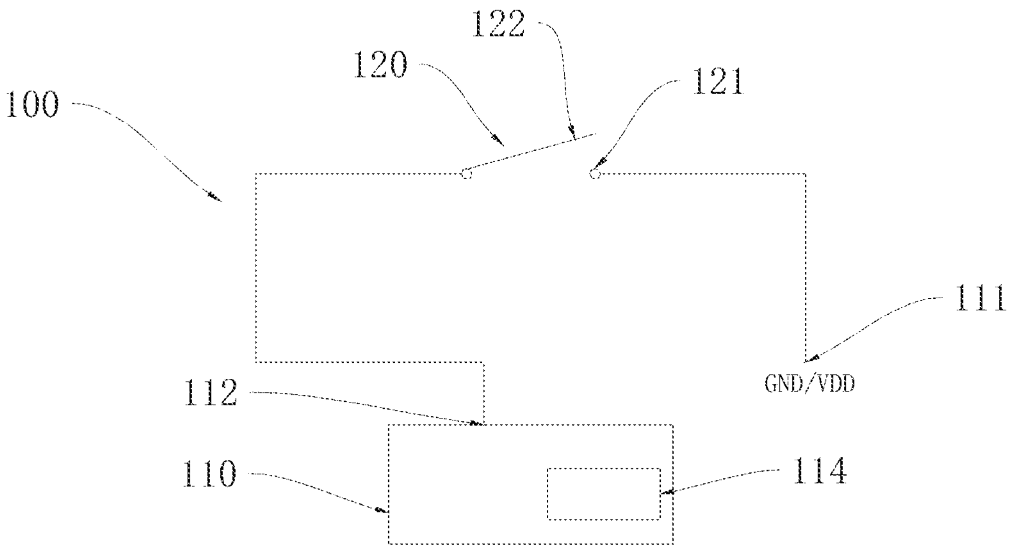
FIG. 5 is a schematic view of a control device in another embodiment of the present application.
Figure 6:
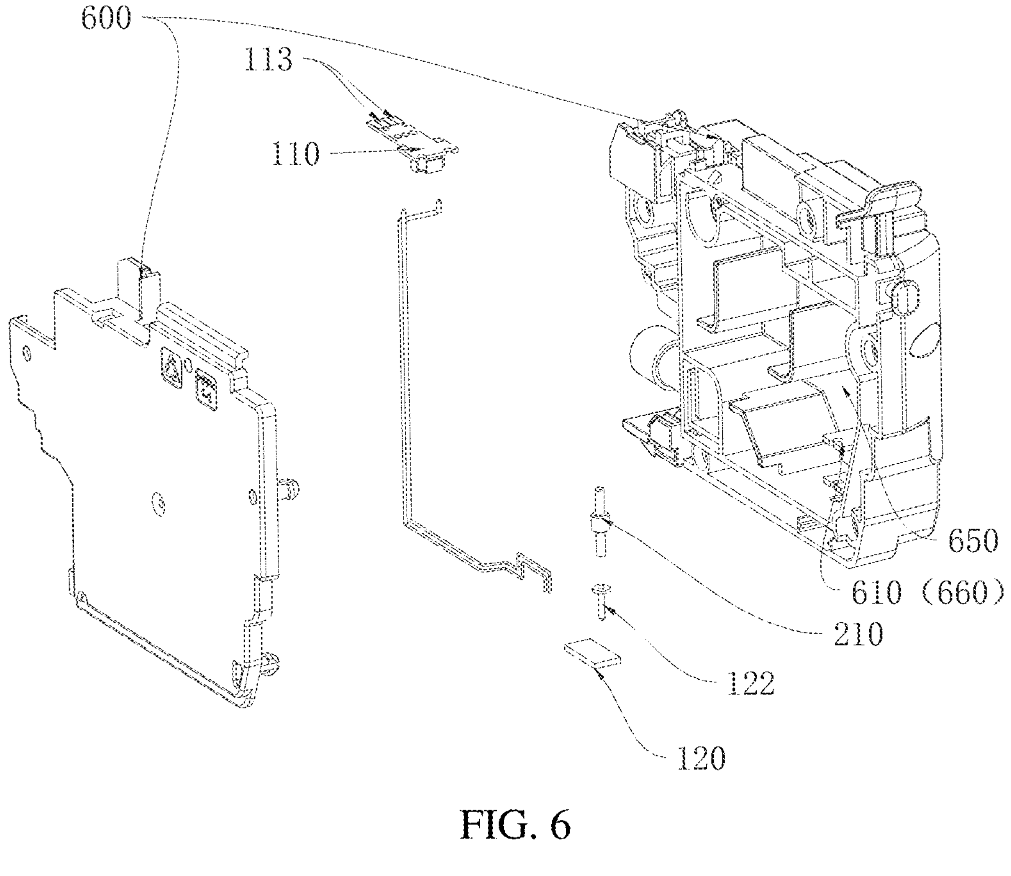
FIG. 6 is a schematic view of the structure of an ink cartridge in an embodiment of the present application.

Alternatively, as shown in FIG. 4 and FIG. 5, the closing or opening of the switch element 120 can control the chip 110 to enter a low-ink-amount working mode, so that the chip 110 disables its electrical connection and/or normal communication connection with the printer 500.

Therefore, the closing or opening of the switch element 120 can control the electrical connection and/or communication connection between the chip 110 and the printer 500, so as to control the printer 500 to print normally or to stop printing.

In one case, when an ink amount is greater than a first preset value, the switch element 120 is open; and when the ink amount decreases to the first preset value, the switch element 120 is closed. In another case, when the ink amount is greater than a first preset value, the switch element 120 is closed; and when the ink amount decreases to the first preset value, the switch element 120 is open.

Figure 2:
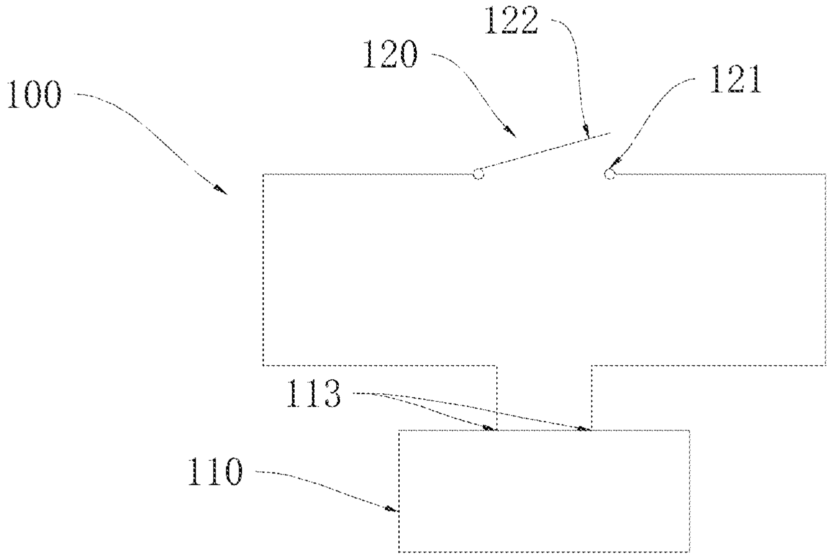
FIG. 2 is a schematic view of a control device in another embodiment of the present application.

Specifically, as shown in FIG. 2, the chip 110 comprises at least two connection terminals 113, the switch element 120 is disposed between two of the connection terminals 113, the switch element 120 can enable or disable the electrical connection between the two connection terminals 113, where the two connection terminals 113 are disconnected, the chip 110 can establish an electrical connection and/or a normal communication connection with the printer 500; where the two connecting terminals 113 are connected, the chip 110 is short-circuited, and its electrical connection and/or the normal communication connection with the printer 500 can be disabled. In this case, when an ink amount is greater than a first preset value, the switch element 120 is open; and when the ink amount decreases to the first preset value, the switch element 120 is closed.

Figure 3:
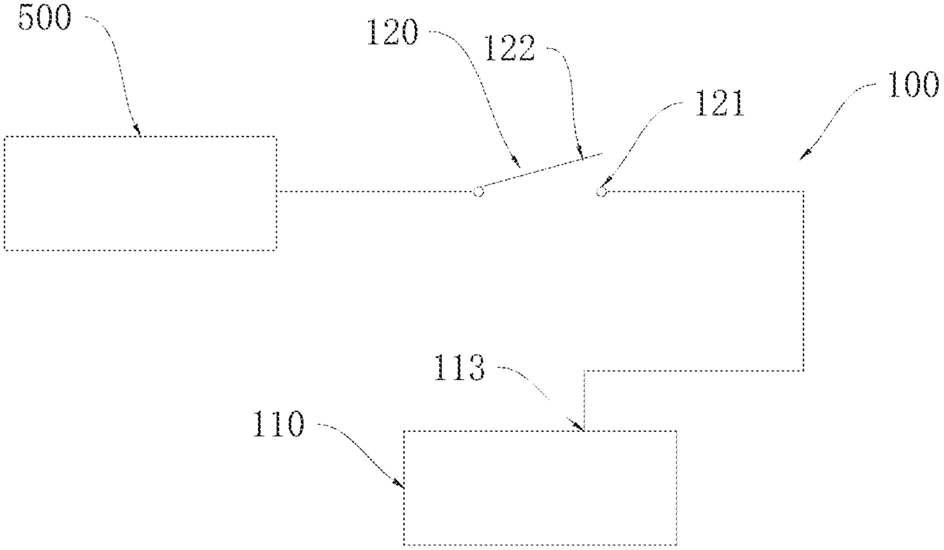
FIG. 3 is a schematic view of a control device in another embodiment of the present application.

As shown in FIG. 3, the switch element 120, the chip 110 and the printer 500 are connected in series, and the switch element 120 is disposed between the chip 110 and the printer 500, where the switch element 120 is closed, the chip 110 can establish an electrical connection and/or normal communication connection with the printer 500; where the switch element 120 is open, the chip 110 is open-circuited, and its electrical connection and/or normal communication connection with the printer 500 can be disabled. In this case, when an ink amount is greater than a first preset value, the switch element 120 is closed; and when the ink amount decreases to the first preset value, the switch element 120 is open.

In another implementation of an embodiment of the present application, as shown in FIG. 4, the chip 110 comprises a determination module 114, a signal-transmission terminal 111 and a signal-reception terminal 112, the switch element 120 can enable or disable the electrical connection between the signal-transmission terminal 111 and the signal-reception terminal 112, where the electrical connection between the signal-transmission terminal 111 and the signal-reception terminal 112 is disabled by the switch element 120, the chip 110 is determined to enter a low-ink-amount working mode by the determination module 114, so that the chip 110 disables its electrical connection and/or the normal communication connection with the printer 500. In this case, when an ink amount is greater than a first preset value, the switch element 120 is closed; and when the ink amount decreases to the first preset value, the switch element 120 is open. In addition, the arrows and waveforms shown in FIG. 4 indicate that the signal-transmission terminal 111 transmits a high-level signal or a low-level signal.

Alternatively, the chip 110 comprises a determination module 114, a signal-transmission terminal 111 and a signal-reception terminal 112, the switch element 120 can enable or disable the electrical connection between the signal-transmission terminal 111 and the signal-reception terminal 112, where the electrical connection between the signal-transmission terminal 111 and the signal-reception terminal 112 is enabled by the switch element 120, the chip 110 is determined to enter a low-ink-amount working mode by the determination module 114, so that the chip 110 disables its electrical connection and/or the normal communication connection with the printer 500. In this case, when an ink amount is greater than a first preset value, the switch element 120 is open; and when the ink amount decreases to the first preset value, the switch element 120 is closed.

The signal-transmission terminal 111 herein can be a signal-transmission pin of the chip 110. As shown in FIG. 5, the signal-transmission terminal 111 can also be a ground terminal or a power supply terminal (GND/VDD), the GND can provide a low-level signal, and the VDD can provide a high-level signal. The signal-transmission terminal 111 can also be a signal-transmission terminal 111 of a separate signal-transmission element by which a signal is transmitted.

The chip 110 enters a low-ink-amount working mode, and the chip 110 disables its electrical connection and/or normal communication connection with the printer 500, which can be the case that any two connection terminals of the chip 110 are controlled to be short-circuited, so that the chip 110 disables its electrical connection and/or normal communication connection with the printer 500.

Alternatively, the chip 110 enters a low-ink-amount working mode, and the chip 110 disables its electrical connection and/or normal communication connection with the printer 500, which can also be the case that the chip 110 is controlled to disable the electrical connection between any of its connection terminals 113 and the printer 500, so that the chip 110 disables its electrical connection and/or normal communication connection with the printer 500;

alternatively, the chip 110 enters a low-ink-amount working mode, and the chip 110 disables its electrical connection and/or normal communication connection with the printer 500, which can also be the case that the chip 110 is controlled to transmit low-ink-amount data to the printer 500, so that the printer 500 disables its electrical connection and/or communication connection with the chip 110 after receiving the low-ink-amount data transmitted by the chip 110;

alternatively, the chip 110 enters a low-ink-amount working mode, and the chip 110 disables its electrical connection and/or normal communication connection with the printer 500, which can also be the case that the chip 110 is controlled to transmit incorrect ink cartridge information/data to the printer 500, so that the printer 500 reports an error, and then the chip 110 disables its electrical connection and/or communication connection with the printer 500.

Further, the above-mentioned ways in which the chip 110 enters a low-ink-amount working mode, and the chip 110 disables its electrical connection and/or normal communication connection with the printer 500, can be selected according to the structure of an ink cartridge, and can also be used in combination of two or more ways.

By means of the control device 100 of embodiments of the present application, which control device 100 is used to control a printer 500, the control device 100 comprises a chip 110 and a control unit, the control unit is in electrical connection and/or in communication connection with the chip 110; the control unit can control a working state of the chip 110, in order to control the electrical connection and/or communication connection between the chip 110 and the printer 500, so as to control the printer 500 to print normally or to stop printing. As a result, when ink in an ink cartridge is sufficient, the printer is controlled to print normally by the control device 100; and when ink in an ink cartridge is less or used up, the printer 500 is controlled to stop printing by the control device 100. Therefore, when ink in an ink cartridge is less or used up, paper waste and waste of resources in the printer 500 caused by incapability of normal printing or continuous operation of the printer 500 can be avoided.

An embodiment of the present application further provides a low-ink-amount detection mechanism which comprises a trigger element and a control device 100, the control device 100 is the control device 100 as described above.

The trigger element can move along with the change of an ink amount, for example, the trigger element can be a structural part that can float in ink and can descend along with the decrease of an ink amount. When an ink amount decreases to a first preset value, the trigger element can get close to or abut against the control unit, and can control a working state of the control unit, and the control device 100 can control the printer 500 to stop printing by the working state of the control unit. The working state of the control unit includes: the closing/opening of a switch element, and a voltage/current signal of a sensing element 130 that varies with external conditions.

When an ink amount is greater than a first preset value, that is, when the ink amount is more, the control device 100 can control the printer 500 to print normally by the control unit.

As a result, in the low-ink-amount detection mechanism in an embodiment of the present application, when ink in an ink cartridge is sufficient, the printer can be controlled to print normally by the cooperation of the trigger element and the control device 100; and when ink in an ink cartridge is less or used up, the printer 500 can be controlled to stop printing by the cooperation of the trigger element and the control device 100. Therefore, when ink in an ink cartridge is less or used up, paper waste and waste of resources in the printer 500 caused by incapability of normal printing or continuous operation of the printer 500 can be avoided.

In one implementation of an embodiment of the present application, the control unit can be a sensing element 130, the trigger element can get close to/abut against the sensing element 130, such that a voltage/current signal of the sensing element 130 varies and the voltage/current signal is transmitted to the chip 110, when the voltage/current signal is determined to reach a preset condition by a determination module 114 of the chip 110, the chip enters a low-ink-amount working mode, so that the chip 110 disables its electrical connection and/or normal communication connection with the printer 500, the printer 500 stops printing. In the present application, the sensing element 130 can be an element that controls a voltage/current signal to vary continuously, such as a pressure sensor, a slide rheostat, etc., embodiments of the present application do not limit the type of the sensing element 130.

Specifically, taking the pressure sensor as an example in this embodiment, as ink is consumed, the trigger element moves along the gravity direction and gradually abuts against the pressure sensor, the pressure sensor controls the voltage/current signal to gradually vary according to the gravity applied by the trigger element. When an ink amount decreases to a first preset value, the voltage/current signal controlled by the pressure sensor is lower than a threshold of the chip 110, and the voltage/current signal is transmitted to the chip 110. At the same time, the voltage/current signal is determined to be lower than the threshold of the chip 110 by the determination module 114 of the chip 110, the chip 110 enters a low-ink-amount working mode, so that the chip 110 disables its electrical connection and/or normal communication connection with the printer 500, the printer 500 stops printing. In other embodiments, when an ink amount decreases to a first preset value, the voltage/current signal controlled by the pressure sensor can also be higher than the threshold of the chip 110, and the voltage/current signal is transmitted to the chip 110. At the same time, after the voltage/current signal transmitted to the chip 110 is determined to be higher than the threshold of the chip 110 by the determination module 114 of the chip 110, the chip 110 enters a low-ink-amount working mode, so that the chip 110 disables its electrical connection and/or normal communication connection with the printer 500, the printer 500 stops printing. "The trigger element moves along the gravity direction and gradually abuts against the pressure sensor" here is the "external condition" as described in the present application.

In one implementation of an embodiment of the present application, the control unit can be a switch element 120, when an ink amount decreases to a first preset value, the movement of the trigger element can trigger the closing or opening of the switch element 120. That is, the movement of the trigger element directly triggers the closing or opening of the switch element 120, when an ink amount decreases to a first preset value, the trigger element moves along with the change of the ink amount to a position that can exactly trigger the closing or opening of the switch element 120, so as to directly trigger the closing or opening of the switch element 120.

Specifically, the switch element 120 comprises a switch contact 121 and a conductive part 122. When the conductive part 122 is separated from the switch contact 121, the switch element 120 is open; and when the conductive member 122 is in contact with the switch contact 121, the switch element 120 is closed.

As shown in FIG. 6 to FIG. 9, the trigger element can be a floating part 210, and the floating part 210 can move along with the change of an ink amount. Specifically, the floating part 210 descends along with the decrease of an ink amount, when the ink amount decreases to a first preset value, the floating part 210 can crimp the conductive part 122 to the switch contact 121, so that the conductive part 122 is in contact with the switch contact 121, so as to enable the switch element 120 to be closed. The floating part 210 can be a structural part that can float in ink, such as a floating ball, a floating sheet, a floating block or a floating rod and the like.

The switch element 120 can be integrated on a flexible circuit board (PCB board), the switch contact 121 can be a contact on the flexible circuit board (PCB board), by driving the movement of the conductive part 122 via the floating part 210, the closing or opening of the switch element 120 is enabled, this structure can enable the closing of the switch element 120 when an ink amount is less or zero, the structure is simple and it requires few parts.

Figure 11:
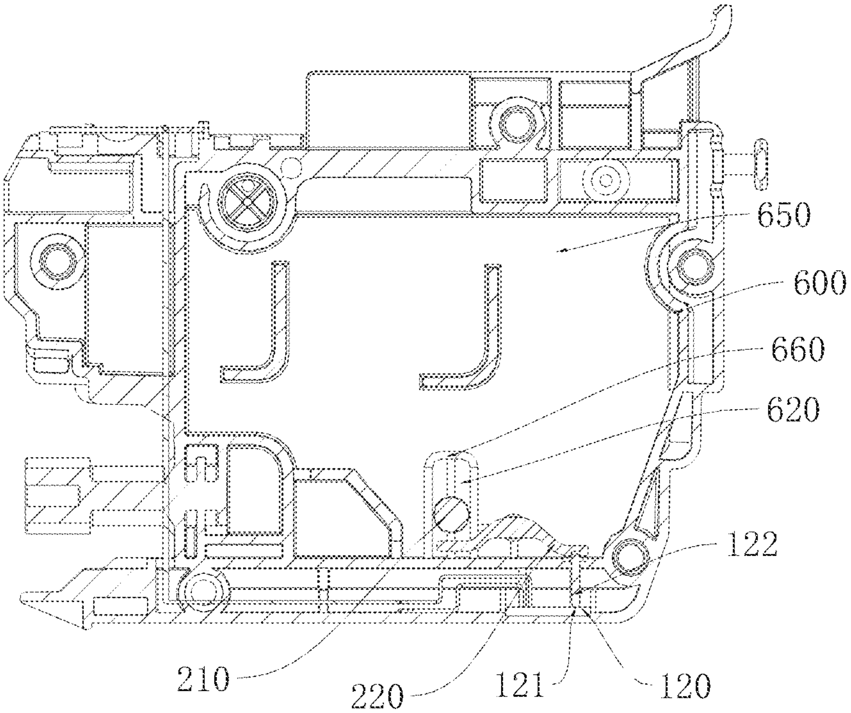
FIG. 11 is a schematic cross-sectional view of the structure of an ink cartridge in another embodiment of the present application.
Figure 12:
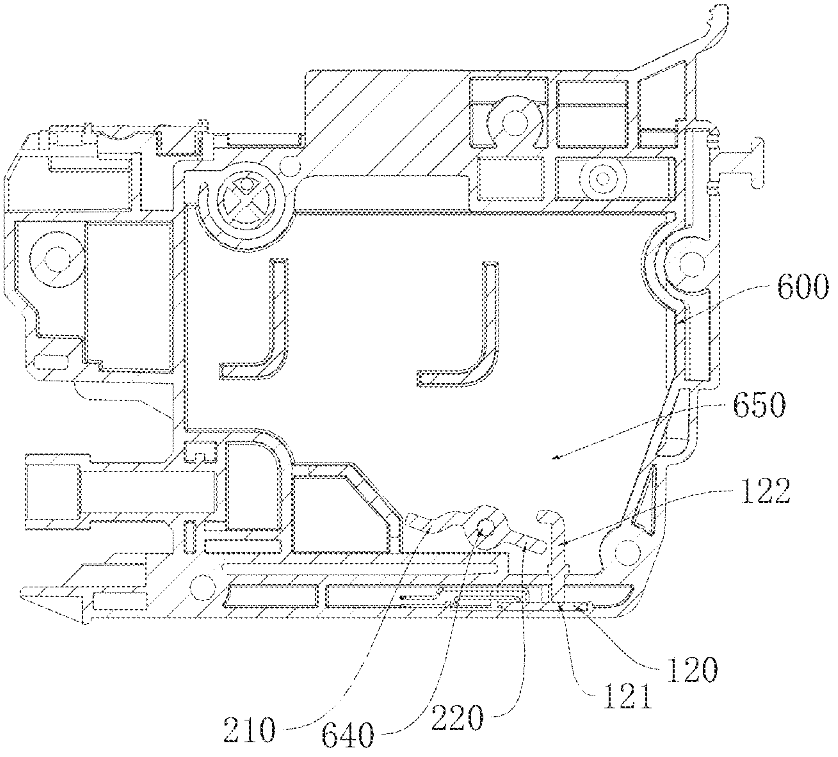
FIG. 12 is a schematic cross-sectional view of the structure of an ink cartridge in another embodiment of the present application.

As shown in FIG. 11 and FIG. 12, the switch element 120 comprises a switch contact 121 and a conductive part 122, the trigger element comprises a floating part 210 and a connection part 220. The floating part 210 can move along with the change of an ink amount, the floating part 210 can abut against or be connected to the connection part 220, and the floating part 210 drives the connection part 220 to move. For example, the floating part 210 can be directly connected to the connection part 220 so as to drive the connection part 220 to move; alternatively, the floating part 210 can abut against the connection part 220 so as to push the connection part 220 to move. When an ink amount decreases to a first preset value, the connection part 220 can disconnect the conductive part 122 from the switch contact 121. Optionally, one end of the connection part 220 can abut against or be connected to the floating part 210, and the other end is opposite to the conductive part 122, the floating part 210 descends along with the decrease of an ink amount, when the ink amount decreases to a first preset value, the floating part 210 descends and the other end of the connection part 220 rises, the conductive part 122 pops open, such that the conductive part 122 is separated from the switch contact 121, so as to enable the switch element 120 to be open. This structure can enable the opening of the switch element 120 when an ink amount is small or zero. The switch contact 121 can be a spring-loaded terminal (POGO pin).

Figure 13:
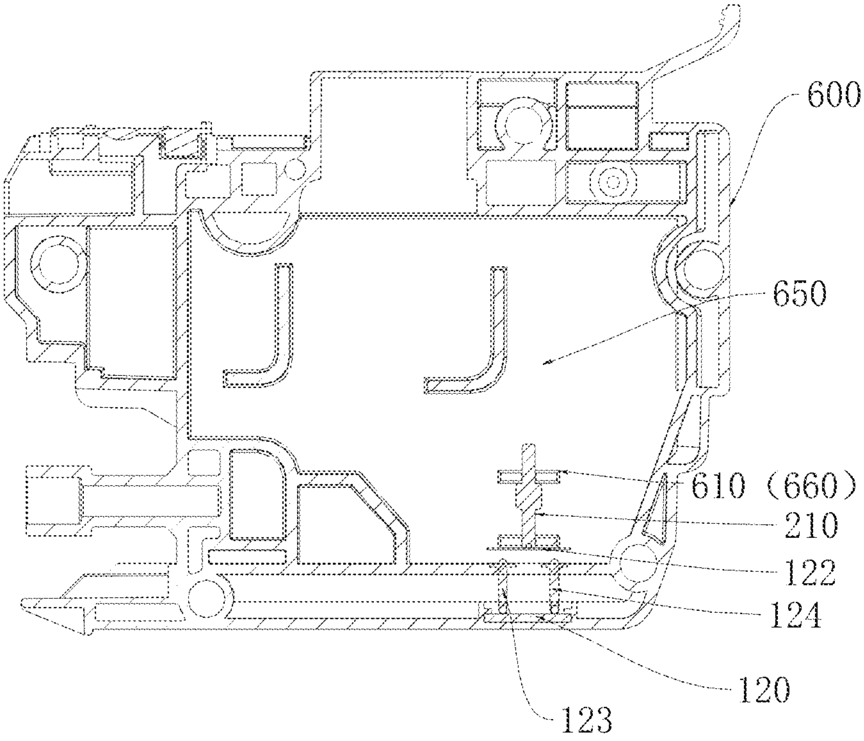
FIG. 13 is a schematic cross-sectional view of the structure of an ink cartridge in another embodiment of the present application.

Alternatively, as shown in FIG. 13, the switch element 120 comprises a first contact 123 and a second contact 124, the trigger element is a conductive floating part which is a part that can both conduct electricity and move along with the change of an ink amount, when an ink amount decreases to a first preset value, the conductive floating part can connect the first contact 123 and the second contact 124. The conductive floating part can move along with the change of an ink amount, specifically, it descends along with the decrease of an ink amount, when an ink amount decreases to a first preset value, the conductive floating part can descend to a position between the first contact point 123 and the second contact point 124, so as to connect the first contact 123 and the second contact 124, so that the switch element 120 is closed. This structure can enable the closing of the switch element 120 when an ink amount is less or zero, the structure is simple and it requires few parts. The switch element 120 can be integrated on a flexible circuit board (PCB board), the first contact 123 and the second contact 124 can be contacts on the flexible circuit board (PCB board), when the first contact 123 and the second contact 124 are connected, the switch element 120 is closed; and when the first contact 123 and the second contact 124 are disconnected, the switch element 120 is open. The first contact 123 and the second contact 124 can be spring loaded terminals (POGO pins).

As shown in FIG. 13, the switch element 120 comprises a first contact 123, a second contact 124 and a conductive part 122, the trigger element is a floating part 210 which can move along with the change of an ink amount, the floating part 210 can abut against or be connected to the conductive part 122, and the floating part 210 drives the conductive part 122 to move. For example, the floating part 210 can be directly connected to the conductive part 122 so as to drive the conductive part 122 to move; alternatively, the floating part 210 can abut against the conductive part 122 so as to push the conductive part 122 to move. When an ink amount decreases to a first preset value, the conductive part 122 can connect or disconnect the first contact 123 and the second contact 124. The floating part 210 descends along with the decrease of an ink amount, and the conductive part 122 can descend or rise depending on the way in which the conductive part 122 and the floating part are connected. When an ink amount decreases to a first preset value, the conductive part 122 descends to a position where the first contact 123 and the second contact 124 are connected, so as to enable the switch element 120 to be closed; alternatively, the conductive part 122 rises to a position where the first contact 123 and the second contact 124 are disconnected, so as to enable the switch element 120 to be open. This structure can enable the closing or opening of the switch element 120 when an ink amount is less or zero. The conductive part 122 can be a metal conductive part.

In other embodiments, the trigger element can also be ink, when an ink amount is greater than a first preset value, the ink can connect the first contact 123 and the second contact 124. As the ink is gradually consumed, it continuously descends along the gravity direction, when an ink amount decreases to a first preset value, for example, the ink is used up, that is, the first preset value is zero, the switch element 120 is open.

Alternatively, in other embodiments, the trigger element is ink which has conductivity and a certain resistance in nature, the ink can connect the first contact 123 and the second contact 124. As ink is gradually consumed, it continuously descends along the gravity direction, and its resistance continuously varies with the continuous decrease of an ink amount. Here, the switch element 120 can also be used as a sensing element 130, that is, the continuous variation of the resistance of ink results in the variation of the voltage/current signal transmitted to the chip 110. At the same time, when the voltage/current signal is determined to reach a preset condition by the determination module 114 of the chip 110, the chip 110 enters a low-ink-amount working mode, so that the chip 110 disables its electrical connection and/or normal communication connection with the printer 500, the printer 500 stops printing. Here, "the decrease of an ink amount results in continuous variation of the resistance of ink" also refers to the "external condition" as described in the present application.

Figure 14:
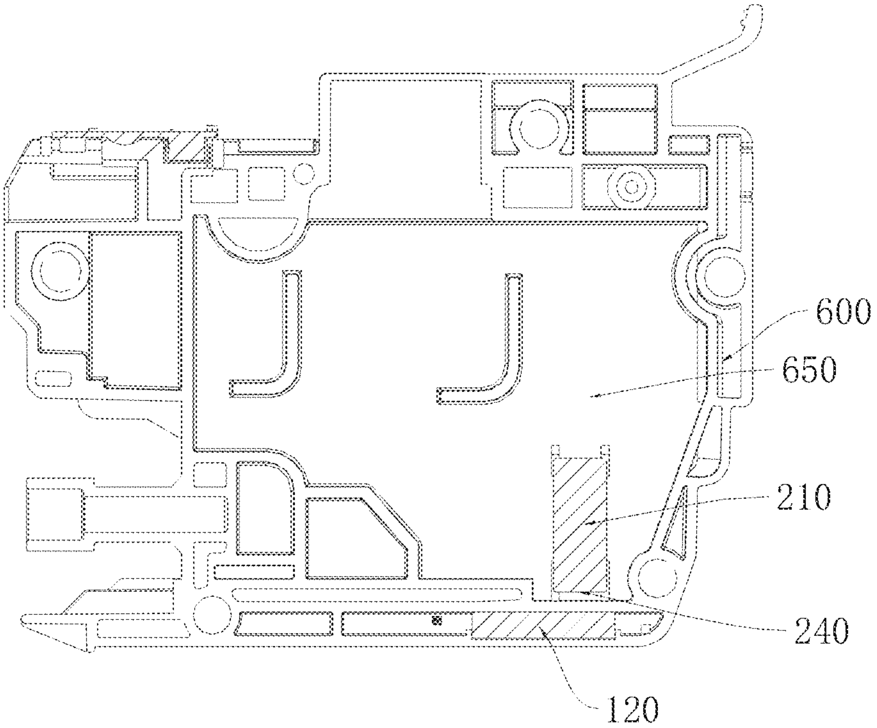
FIG. 14 is a schematic cross-sectional view of the structure of an ink cartridge in another embodiment of the present application.
Figure 15:
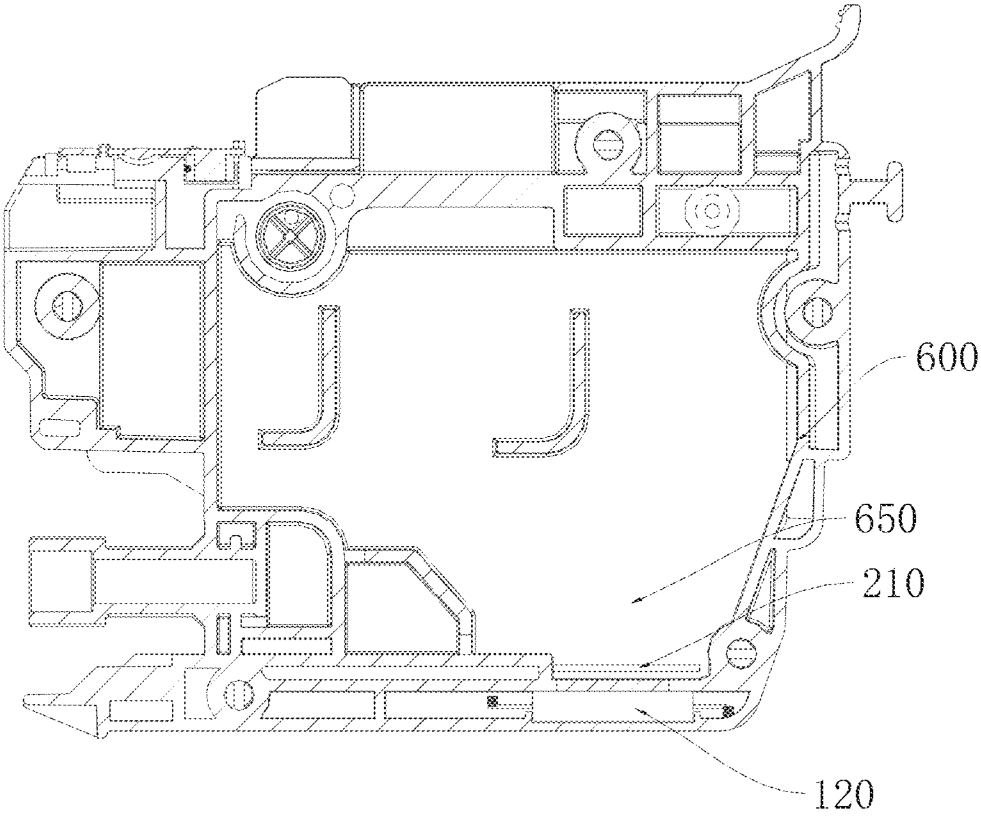
FIG. 15 is a schematic cross-sectional view of the structure of an ink cartridge in another embodiment of the present application.

In one implementation of an embodiment of the present application, the control unit can be a switch element 120, as shown in FIG. 14 and FIG. 15, the switch element 120 can be a inductive switch element, when an ink amount decreases to a first preset value, the trigger element can move into a sensing range of the switch element 120 so as to trigger the closing or opening of the switch element 120. That is, the trigger element may not directly trigger the switch element 120; rather, it can move into a sensing range of the switch element 120 so as to control the closing or opening of the switch element 120. This structure allows for flexible placement of the switch element 120, which does not necessarily have to be disposed below the trigger element.

Further, the switch element 120 further comprises a signal-reception unit and a controller, the signal-reception unit is used to receive a signal from the trigger element, and the controller is used to control the closing or opening of the switch element 120 according to the signal from the trigger element.

For example, the switch element 120 can be a Hall sensor switch element, a pressure sensor switch element, or a position sensor switch element. The switch element 120 is not limited to a Hall sensor switch element, a pressure switch element, or a position sensor switch element, the type of the switch element 120 is not limited in embodiments of the present application, any element that can enable signal on/off can be comprised in the scope of the switch element 120.

Where the switch element 120 is a Hall sensor switch element, the trigger element can be a magnetic floating part 210 which can move along with the change of an ink amount; alternatively, a magnetic part 240 is disposed on the floating part 210, the magnetic part 240 and the floating part 210 can move along with the change of an ink amount. When an ink amount decreases to a first preset value, the Hall sensor switch element detects a feedback signal that is generated by the magnetic floating part 210 or the magnetic part 240, so as to control the closing or opening of the switch element 120.

Where the switch element 120 is a pressure sensor switch element, the trigger element can be a floating part 210 which can move along with the change of an ink amount. When an ink amount decreases to a first preset value, the pressure sensor switch element detects a feedback signal that is generated by the floating part 210, so as to control the closing or opening of the switch element 120.

Where the switch element 120 is a position sensor switch element, the trigger element can be a floating part 210 which can move along with the change of an ink amount. When an ink amount decreases to a first preset value, the position sensor switch element detects a feedback signal that is generated by the floating part 210 as it moves to a preset position, so as to control the closing or opening of the switch element 120.

As for the low-ink-amount detection mechanism in an embodiment of the present application, a trigger element is disposed inside the ink cartridge which moves along directly with the change of an ink amount and can accurately detect the ink amount in real time. By means of the low-ink-amount detection mechanism in an embodiment of the present application, when ink in an ink cartridge is less or used up, the trigger element can get close to or abut against the control unit and can control a working state of the control unit, the printer 500 is controlled to stop printing by the control device 100. Therefore, when ink in an ink cartridge is less or used up, paper waste and waste of resources in the printer 500 caused by incapability of normal printing or continuous operation of the printer 500 can be avoided.

As shown in FIG. 6 to FIG. 15, an embodiment of the present application further provides an ink cartridge which comprises a housing 600 and a low-ink-amount detection mechanism, the low-ink-amount detection mechanism is the low-ink-amount detection mechanism as described above. A chamber 650 is disposed within the housing 600 for holding ink, a trigger element is disposed in the chamber 650, the chip 110 is disposed on the housing 600, and the chip 110 can further store relevant information of the ink cartridge thereon. The housing 600 can comprise a housing body and a housing cover, the housing body and the housing cover together enclose the chamber 650.

The ink cartridge comprises the above-mentioned low-ink-amount detection mechanism, and the low-ink-amount detection mechanism comprises the above-mentioned control device 100. The detection of the ink amount of an ink cartridge and the control of the printer 500 are enabled by the low-ink-amount detection mechanism, specifically, by the trigger element and the control device 100 of the low-ink-amount detection mechanism.

When ink in an ink cartridge is sufficient, the printer 500 is controlled to print normally by the cooperation of the trigger element and the control device 100; when ink in an ink cartridge is less or used up, the printer 500 is controlled to stop printing by the cooperation of the trigger element and the control device 100. Therefore, when ink in an ink cartridge is less or used up, paper waste and waste of resources in the printer 500 caused by incapability of normal printing or continuous operation of the printer 500 can be avoided.

Specifically, when ink in an ink cartridge is less or used up, the trigger element can get close to or abut against the control unit and can control a working state of the control unit, so as to control the printer 500 to stop printing.

In an embodiment of the present application, a limiting member is disposed in the housing 600, when an ink amount is greater than a second preset value, the limiting member can limit the movement of the trigger element, and the second preset value is greater than the first preset value. When an ink amount is greater than a second preset value, that is, there is more ink in the ink cartridge, and the ink will not be less or used up at this time and for a period of time thereafter, at this time, the limiting member limits the movement of the trigger element, so that the trigger element can be prevented from moving in a larger range. The limiting member can be a part of the housing or a separate part.

Figure 7:
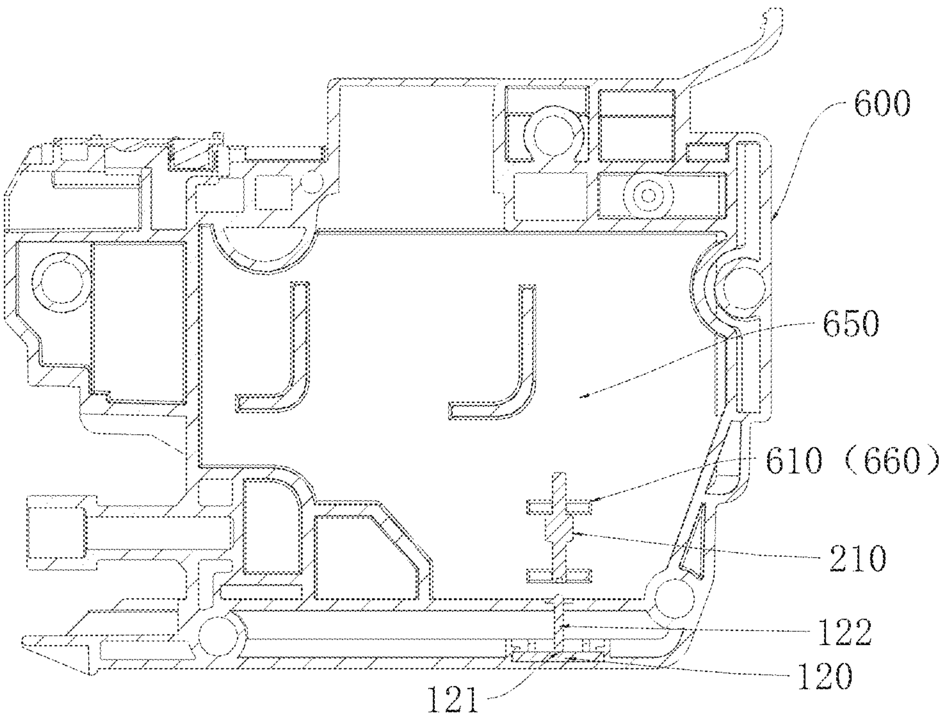
FIG. 7 is a schematic cross-sectional view of the structure of FIG. 6.

The trigger element is disposed in the chamber 650 and it can be disposed in the chamber 650 in a variety of ways, for example, including one or more of the following arrangements:

as shown in FIG. 7 and FIG. 13, a mounting plate 610 is disposed in the housing 600, and the mounting plate 610 is provided with a guide hole. The trigger element is a columnar trigger element and it extends into the guide hole, and the trigger element can be in slip-fit with the guide hole, so that the trigger element can be disposed in the chamber 650 via the mounting plate 610, and one of the mounting plates 610 can also serve as the above-mentioned limiting member 660. When the trigger element rises to a preset height, the mounting plate 610 can prevent the trigger element from continuing to rise. For example, the trigger element is provided with a step, and the size of the step is larger than that of the guide hole, when the step is in contact with the mounting plate 610, the mounting plate 610 can prevent the step from continuing to rise, so as to prevent the trigger element from continuing to rise. The guide hole of the mounting plate 610 can also serve as a guide during the movement of the trigger element.

Figure 8:
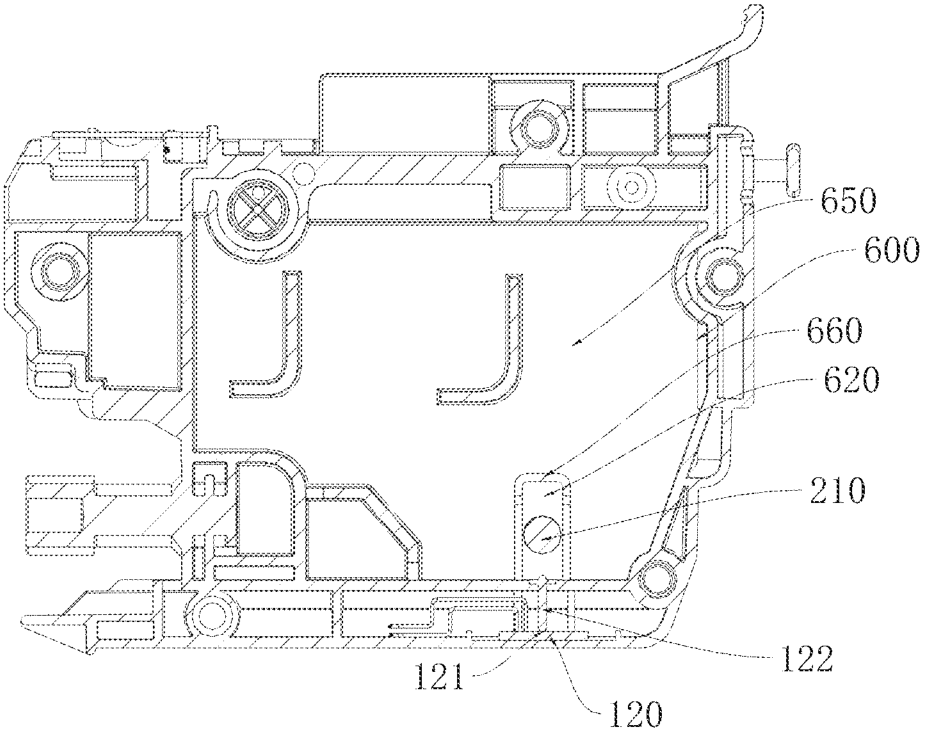
FIG. 8 is a schematic cross-sectional view of the structure of an ink cartridge in another embodiment of the present application.

As shown in FIG. 8 and FIG. 11, a guide groove 620 is disposed in the housing 600, the trigger element is a block-shaped element or a spherical trigger element and is disposed in the guide groove 620, and the trigger element can be in slip-fit with the side wall of the guide groove 620, so that the trigger element can be disposed in the chamber 650 via the guide groove 620, and a limiting member 660 can be disposed at the top of the guide groove 620, for example, a baffle is disposed and used as the limiting member 660, or a top wall of the guide groove 620 serves as the limiting member 660. The side wall of the guide groove 620 can serve as a guide during the movement of the trigger element.

Figure 9:
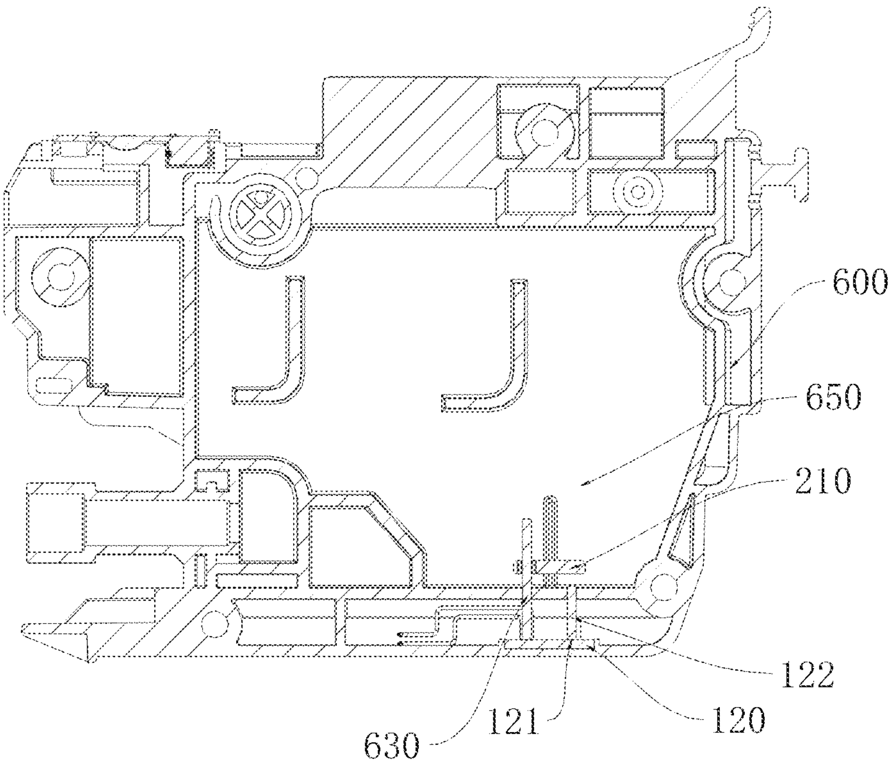
FIG. 9 is a schematic cross-sectional view of the structure of an ink cartridge in another embodiment of the present application.

As shown in FIG. 9, a guide column 630 is disposed in the housing 600, the trigger element is a sheet-like trigger element and is provided with a mounting hole, the mounting hole can be in slip-fit with the guide column 630, so that the trigger element can be disposed in the chamber 650 via the guide column 630. Moreover, a protrusion can be disposed on the guide column 630, and the protrusion can serve as a limiting member, which prevents the trigger element from continuing to rise when the trigger element rises to a preset height. The guide column 630 can also serve as a guide during the movement of the trigger element.

Figure 10:
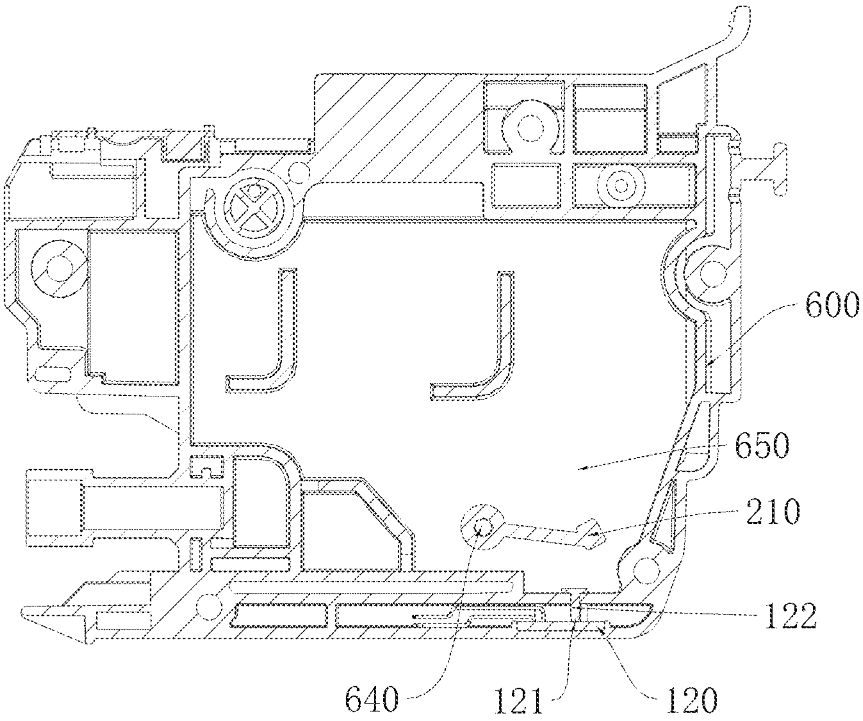
FIG. 10 is a schematic cross-sectional view of the structure of an ink cartridge in another embodiment of the present application.

As shown in FIG. 10, a pivot shaft 640 is disposed in the housing 600, the trigger element is a rod-shaped trigger element, and the trigger element is provided with a hinge portion which can be in running-fit with the pivot shaft 640, so that the trigger element can be disposed in the chamber 650 via the pivot shaft 640.

Figure 16:
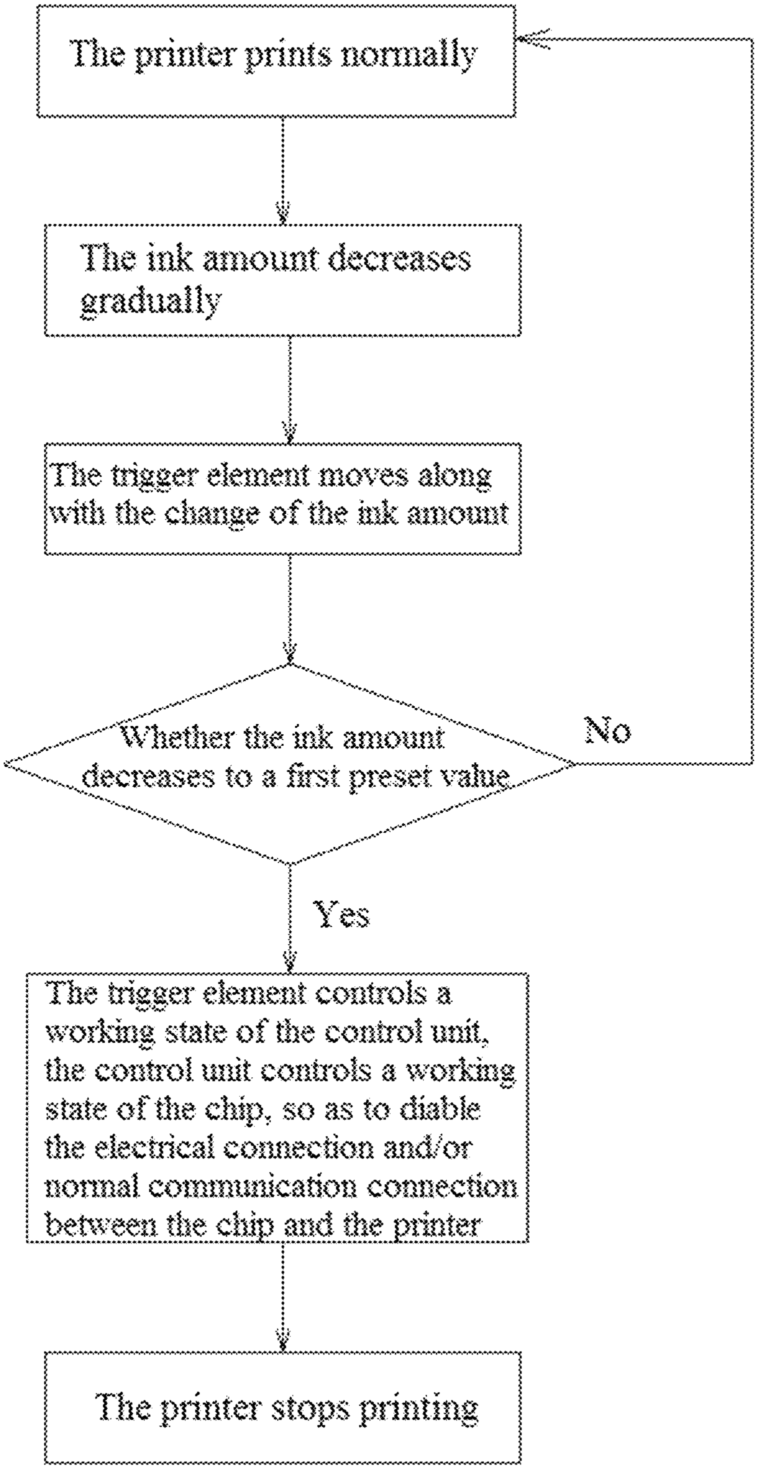
FIG. 16 is a flow chart of a low-ink-amount detection method for an ink cartridge in an embodiment of the present application.

As shown in FIG. 16, an embodiment of the present application further provides a low-ink-amount detection method for an ink cartridge, the ink cartridge is the ink cartridge as described above.

Where the control unit is a sensing element 130:

the trigger element moves along with the change of an ink amount;

when an ink amount decreases to a first preset value, the trigger element triggers a voltage/current signal of the sensing element 130 to vary, and the voltage/current signal is transmitted to the chip 110, when the voltage/current signal is determined to reach a preset condition by the chip 110, the chip 110 enters a low-ink-amount working mode, so that the chip 110 disables its electrical connection and/or normal communication connection with the printer 500, the printer 500 stops printing.

Where the control unit is a switch element 120:

the trigger element moves along with the change of an ink amount;

when an ink amount decreases to a first preset value, the trigger element triggers the opening or closing of the switch element 120, the switch element 120 controls a working state of the chip 110, so as to disable the electrical connection and/or normal communication connection between the chip 110 and the printer 500, the printer 500 stops printing.

Moreover, when an ink amount is greater than a first preset value, the trigger element triggers the opening or closing of the switch element 120, the switch element 120 controls a working state of the chip 110, so as to establish an electrical connection and/or a normal communication connection between the chip 110 and the printer 500, the printer can print normally.

In the above-mentioned low-ink-amount detection method for an ink cartridge, the switch element 120 controlling a working state of the chip 110, so as to disable the electrical connection and/or normal communication connection between the chip 110 and the printer 500, specifically comprises that: the switch element 120 is closed and two connection terminals of the chip 110 are connected, so that the chip 110 is in a short-circuit state, so as to disable the electrical connection and/or normal communication connection between the chip 110 and the printer 500; alternatively, the switch element 120 is open, such that the chip 110 is in an open-circuit state, so as to disable the electrical connection and/or normal communication connection between the chip 110 and the printer 500; alternatively, the chip 110 enters a low-ink working mode, so as to disable the electrical connection and/or normal communication connection between the chip 110 and the printer 500.

The chip 110 enters a low-ink-amount working mode, so as to disable the electrical connection and/or normal communication connection between the chip 110 and the printer 500, which can be the case that any two connection terminals of the chip 110 are controlled to be short-circuited, so that the chip 110 disables its electrical connection and/or normal communication connection with the printer 500;

the chip 110 enters a low-ink-amount working mode, so as to disable the electrical connection and/or normal communication connection between the chip 110 and the printer 500, which can also be the case that the chip 110 is controlled to disable the electrical connection between any of its connection terminals and the printer 500, so that the chip 110 disables its electrical connection and/or normal communication connection with the printer 500;

the chip 110 enters a low-ink-amount working mode, so as to disable the electrical connection and/or normal communication connection between the chip 110 and the printer 500, which can also be the case that the chip 110 is controlled to transmit low-ink-amount data to the printer 500, so that the printer 500 disables its electrical connection and/or normal communication connection with the chip 110 after receiving the low-ink-amount data transmitted by the chip 110;

the chip 110 enters a low-ink-amount working mode, so as to disable the electrical connection and/or normal communication connection between the chip 110 and the printer 500, which can also be the case that the chip 110 is controlled to transmit incorrect ink cartridge information/data to the printer 500, so that the printer 500 reports an error, and then the chip disables its electrical connection and/or normal communication connection with the printer 500.

Further, the above-mentioned ways in which the chip 110 enters a low-ink-amount working mode, and the chip 110 disables its electrical connection and/or normal communication connection with the printer 500, can be selected according to the structure of an ink cartridge, and can also be used in combination of two or more ways.

By means of the low-ink-amount detection method for an ink cartridge in embodiments of the present application, when ink in an ink cartridge is sufficient, the printer can be controlled to print normally by the cooperation of the trigger element, the control unit and the chip 110; when ink in an ink cartridge is less or used up, the printer 500 can be controlled to stop printing by the cooperation of the trigger element, the control unit and the chip 110. Therefore, when ink in an ink cartridge is less or used up, paper waste and waste of resources in the printer 500 caused by incapability of normal printing or continuous operation of the printer 500 can be avoided.

The above embodiments of the present application focus on description of differences among various embodiments, different optimized features from various embodiments can be combined to form more preferred embodiments so long as they are not contradictory, this will not be repeated here for the purpose of clarity.

The above are merely embodiments of the present application and are not intended to limit the present application. Those skilled in the art will appreciate that, various modification and alteration can be made to the present application. Any modification, equivalent replacement, improvement, etc., that is made within the principle of the present application should be included within the scope of the claims of the present application.

What is claimed is:

1. A control device for controlling a printer, wherein the control device comprises a chip and a control unit, the control unit is in electrical connection and/or in communication connection with the chip; the control unit can control a working state of the chip, so as to control the electrical connection and/or communication connection between the chip and the printer;

wherein the control unit is a switch element;

wherein the chip comprises a determination module, a signal-transmission terminal and a signal-reception terminal, the switch element can enable or disable the electrical connection between the signal-transmission terminal and the signal-reception terminal, where the electrical connection between the signal-transmission terminal and the signal-reception terminal is enabled or disabled by the switch element, the chip is determined to enter a low-ink-amount working mode by the determination module, the chip disables its electrical connection and/or normal communication connection with the printer.

2. The control device according to claim 1, wherein the control unit is a sensing element, the sensing element is in electrical connection and/or in communication connection with the chip, the sensing element can vary a voltage/current signal according to external conditions and transmit the voltage/current signal to the chip, when the voltage/current signal is determined to reach a preset condition by the chip, the chip enters a low-ink-amount working mode, so that the chip disables its electrical connection and/or normal communication connection with the printer, the printer stops printing.

3. The control device according to claim 1, wherein the closing of the switch element can disable the electrical connection and/or normal communication connection between the chip and the printer, then the printer stops printing;

alternatively, the opening of the switch element can disable the electrical connection and/or normal communication connection between the chip and the printer, then the printer stops printing;

alternatively, the closing or opening of the switch element can control the chip to enter a low-ink-amount working mode, so that the chip disables its electrical connection and/or normal communication connection with the printer, then the printer stops printing.

4. The control device according to claim 3, wherein the chip comprises at least two connection terminals, the switch element is disposed between two of the connection terminals, the switch element can enable or disable the electrical connection between the two connection terminals, where the two connection terminals are disconnected, the chip can establish an electrical connection and/or a normal communication connection with the printer; where the two connecting terminals are connected, the chip is short-circuited and its electrical connection and/or the normal communication connection with the printer can be disabled.

5. The control device according to claim 3, wherein the switch element, the chip and the printer are connected in series, and the switch element is disposed between the chip and the printer, where the switch element is closed, the chip can establish an electrical connection and/or a normal communication connection with the printer; where the switch element is open, the chip is open-circuited and its electrical connection and/or normal communication connection with the printer can be disabled.

6. The control device according to claim 2, wherein the chip comprises a determination module, a signal-transmission terminal and a signal-reception terminal, the sensing element can vary a voltage/current signal of the signal-transmission terminal and the signal-reception terminal according to external conditions, when the voltage/current signal is determined to reach a preset condition by the determination module, the chip enters a low-ink-amount working mode, and the chip disables its electrical connection and/or normal communication connection with the printer.

7. The control device according to claim 6, wherein the chip entering a low-ink-amount working mode, and the chip disabling its electrical connection and/or normal communication connection with the printer comprises at least one of that:

any two connection terminals of the chip are controlled to be short-circuited, so that the chip disables its electrical connection and/or normal communication connection with the printer;

the chip is controlled to disable the electrical connection between any of its connection terminals and the printer, so that the chip disables its electrical connection and/or normal communication connection with the printer;

the chip is controlled to transmit low-ink-amount data to the printer, the printer disables its electrical connection and/or normal communication connection with the chip after receiving the low-ink-amount data transmitted by the chip;

the chip is controlled to transmit incorrect ink cartridge information/data to the printer, so that the printer reports an error, and then disables its electrical connection and/or normal communication connection with the printer.

8. A low-ink-amount detection mechanism, comprising a trigger element and the control device according to claim 1, wherein the trigger element can move along with the change of an ink amount, when the ink amount decreases to a first preset value, the trigger element can get close to or abut against the control unit and can control a working state of the control unit.

9. The low-ink-amount detection mechanism according to claim 8, wherein the control unit is a sensing element, the trigger element can get close to the sensing element, such that a voltage/current signal of the sensing element varies, and the voltage/current signal is transmitted to the chip, when the voltage/current signal is determined to reach a preset condition by the chip, the chip enters a low-ink-amount working mode, so that the chip disables its electrical connection and/or normal communication connection with the printer, the printer stops printing.

10. The low-ink-amount detection mechanism according to claim 8, wherein the control unit is a switch element, when the ink amount decreases to a first preset value, the trigger element can abut against the switch element so as to trigger the closing or opening of the switch element.

11. The low-ink-amount detection mechanism according to claim 10, wherein the switch element comprises a switch contact and a conductive part, the trigger element is a floating part, when the ink amount decreases to a first preset value, the floating part can crimp the conductive part to the switch contact so as to trigger the closing of the switch element.

12. The low-ink-amount detection mechanism according to claim 10, wherein the switch element comprises a switch contact and a conductive part, the trigger element comprises a floating part and a connection part, the floating part can move along with the change of an ink amount, the floating part can abut against or be connected to the connection part, and the floating part drives the connection part to move, when the ink amount decreases to a first preset value, the connection part can disconnect the conductive part from the switch contact so as to trigger the opening of the switch element.

13. The low-ink-amount detection mechanism according to claim 10, wherein the switch element comprises a first contact and a second contact, the trigger element is a conductive floating part, when the ink amount decreases to a first preset value, the conductive floating part can connect the first contact and the second contact so as to trigger the closing of the switch element.

14. The low-ink-amount detection mechanism according to claim 10, wherein the switch element comprises a first contact, a second contact and a conductive part, the trigger element is a floating part, the floating part can move along with the change of an ink amount, the floating part can abut against or be connected to the conductive part, and the floating part drives the conductive part to move, when the ink amount decreases to a first preset value, the conductive part can connect or disconnect the first contact and the second contact so as to trigger the closing or opening of the switch element.

15. The low-ink-amount detection mechanism according to claim 8, wherein the control unit is a switch element, and the switch element is a sensing switch element, when the ink amount decreases to a first preset value, the trigger element can move into a sensing range of the switch element so as to trigger the closing or opening of the switch element.

16. The low-ink-amount detection mechanism according to claim 15, wherein the switch element further comprises a signal-reception unit and a controller, the signal-reception unit is used to receive a signal from the trigger element, and the controller is used to control the closing or opening of the switch element according to the signal from the trigger element.

17. The low-ink-amount detection mechanism according to claim 15, wherein the switch element is a Hall sensor switch element, a pressure sensor switch element or a position sensor switch element.

18. An ink cartridge, comprising a housing and the low-ink-amount detection mechanism according to claim 8, wherein the housing is provided with a chamber for holding ink, the trigger element is disposed in the chamber, and the chip is disposed on the housing.

19. The ink cartridge according to claim 18, wherein a limiting member is disposed in the housing, when the ink amount is greater than a second preset value, the limiting member can limit the movement of the trigger element, the second preset value is greater than the first preset value.

20. The ink cartridge according to claim 18, wherein disposing the trigger element in the chamber comprises at least one of that:

a mounting plate is disposed in the housing, the mounting plate is provided with a guide hole, the trigger element is a columnar trigger element, the trigger element extends into the guide hole, and the trigger element can be in slip-fit with the guide hole;

a guide groove is disposed in the housing, the trigger element is a block-shaped or spherical trigger element, the trigger element is disposed in the guide groove, and the trigger element can be in slip-fit with an inner wall of the guide groove;

a guide column is disposed in the housing, the trigger element is a sheet-like trigger element, the trigger element is provided with a mounting hole, and the mounting hole can be in slip-fit with the guide column;

a pivot shaft is disposed in the housing, the trigger element is a rod-shaped trigger element, the trigger element is provided with a hinge portion, and the hinge portion can be in running-fit with the pivot shaft.

21. A low-ink-amount detection method for an ink cartridge, wherein the ink cartridge is the ink cartridge according to claim 18, and the control unit is a sensing element;

the trigger element moves along with the change of an ink amount;

when the ink amount decreases to a first preset value, the trigger element triggers a voltage/current signal of the sensing element to vary, and the voltage/current signal is transmitted to the chip, when the voltage/current signal is determined to reach a preset condition by the chip, the chip enters a low-ink-amount working mode, so that the chip disables its electrical connection and/or normal communication connection with the printer, the printer stops printing.

22. A low-ink-amount detection method for an ink cartridge, wherein the ink cartridge is the ink cartridge according to claim 18, and the control unit is a switch element;

the trigger element moves along with the change of an ink amount;

when the ink amount decreases to a first preset value, the trigger element triggers the opening or closing of the switch element, the switch element controls a working state of the chip, so as to disable the electrical connection and/or normal communication connection between the chip and the printer, the printer stops printing.

23. The low-ink-amount detection method for an ink cartridge according to claim 22, wherein the switch element controlling a working state of the chip, so as to disable the electrical connection and/or normal communication connection between the chip and the printer comprises that:

the switch element is closed and two connection terminals of the chip are connected, such that the chip is in a short-circuit state, so as to disable the electrical connection and/or normal communication connection between the chip and the printer;

alternatively, the switch element is open, such that the chip is in an open-circuit state, so as to disable the electrical connection and/or normal communication connection between the chip and the printer;

alternatively, the chip enters a low-ink working mode, so as to disable the electrical connection and/or normal communication connection between the chip and the printer.

24. The low-ink-amount detection method for an ink cartridge according to claim 21, wherein the chip entering a low-ink-amount working mode, so as to disables the electrical connection and/or normal communication connection between chip and the printer comprises at least one of that:

any two connection terminals of the chip are controlled to be short-circuited, so that the chip disables its electrical connection and/or normal communication connection with the printer;

the chip is controlled to disable the electrical connection between any of its connection terminals and the printer, so that the chip disables its electrical connection and/or normal communication connection with the printer;

the chip is controlled to transmit low-ink-amount data to the printer, so that the printer disables its electrical connection and/or normal communication connection with the chip after receiving the low-ink-amount data transmitted by the chip;

the chip is controlled to transmit incorrect ink cartridge information/data to the printer, so that the printer reports an error, and then disables its electrical connection and/or normal communication connection with the printer.

25. The control device according to claim 1, wherein the chip entering a low-ink-amount working mode, and the chip disabling its electrical connection and/or normal communication connection with the printer comprises at least one of that:

any two connection terminals of the chip are controlled to be short-circuited, so that the chip disables its electrical connection and/or normal communication connection with the printer;

the chip is controlled to disable the electrical connection between any of its connection terminals and the printer, so that the chip disables its electrical connection and/or normal communication connection with the printer;

the chip is controlled to transmit low-ink-amount data to the printer, the printer disables its electrical connection and/or normal communication connection with the chip after receiving the low-ink-amount data transmitted by the chip;

the chip is controlled to transmit incorrect ink cartridge information/data to the printer, so that the printer reports an error, and then disables its electrical connection and/or normal communication connection with the printer.

26. The low-ink-amount detection method for an ink cartridge according to claim 23, wherein the chip entering a low-ink-amount working mode, so as to disable the electrical connection and/or normal communication connection between chip and the printer comprises at least one of that:

any two connection terminals of the chip are controlled to be short-circuited, so that the chip disables its electrical connection and/or normal communication connection with the printer;

the chip is controlled to disable the electrical connection between any of its connection terminals and the printer, so that the chip disables its electrical connection and/or normal communication connection with the printer;

the chip is controlled to transmit low-ink-amount data to the printer, so that the printer disables its electrical connection and/or normal communication connection with the chip after receiving the low-ink-amount data transmitted by the chip;

the chip is controlled to transmit incorrect ink cartridge information/data to the printer, so that the printer reports an error, and then disables its electrical connection and/or normal communication connection with the printer.

* * * * *